(12) United States Patent
Oliveira et al.

(10) Patent No.: US 8,296,224 B2
(45) Date of Patent: Oct. 23, 2012

(54) CONSTRAINED OPTIMIZED BINNING FOR SCORECARDS

(75) Inventors: Ivan Borges Oliveira, Moncure, NC (US); Manoj Keshavmurthi Chari, Cary, NC (US); David Rawlins Duling, Durham, NC (US); Susan Edwards Haller, Raleigh, NC (US); Robert William Pratt, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 882 days.

(21) Appl. No.: 12/241,762

(22) Filed: Sep. 30, 2008

(65) Prior Publication Data

US 2010/0082469 A1    Apr. 1, 2010

(51) Int. Cl.
*G06Q 40/00* (2012.01)
(52) U.S. Cl. .......................................................... 705/38
(58) Field of Classification Search ...................... 705/38
See application file for complete search history.

(56) References Cited

U.S. PATENT DOCUMENTS

| | | | | |
|---|---|---|---|---|
| 6,513,018 B1 * | 1/2003 | Culhane | ........................... | 705/35 |
| 7,577,624 B2 * | 8/2009 | Peacock et al. | .................. | 706/17 |
| 2006/0106797 A1 * | 5/2006 | Srinivasa et al. | ................... | 707/6 |
| 2009/0299896 A1 * | 12/2009 | Zhang et al. | ..................... | 705/38 |
| 2009/0299911 A1 * | 12/2009 | Abrahams et al. | .......... | 705/36 R |

OTHER PUBLICATIONS

Bolat et al.: A surrogate objective for utility work in paced assembly lines, Technical Report 91-32, Oct. 1991, pp. 1-18.*
Siddiqi, N: Credit Risk Scorecards—Developing and Implementing Intelligent Credit Scoring, John Wiley & Sons, Inc., 2006, pp. 1-210.*
Hebabou et al.: Variable selection in the credit card industry, NESUG 2006, pp. 1-5.*
Greene et al.: Competition-based induction of decision models from examples. 1993, Machine Learning, 13, pp. 229-257.*
Breakspear et al.: Detection and description of non-linear interdependence in normal multichannel human EEG data.*
Schreiber et al.: Surrogate time series, Physica D, 142 (2000) pp. 346-382.*
Chari, Manoj, PowerPoint presentation entitled "Some Optimization Applications at SAS Institute", 41 pp. [2006].
FairIsaac, Technology Guide to the Scorecard Module, pp. 1-40 [May 2004].

* cited by examiner

*Primary Examiner* — Bijendra K Shrestha
(74) *Attorney, Agent, or Firm* — Jones Day

(57) ABSTRACT

Computer-implemented systems and methods are provided for generating bins for a scorecard. An approximate set of bins is generated by applying an optimization model to binning data. The optimization model includes an objective function, constraints, and surrogate weight of evidence metric(s). The approximated set of bins are then used in scorecard operations.

15 Claims, 10 Drawing Sheets

CONSTRAINED OPTIMIZED BINNING FOR SCORECARDS

TECHNICAL FIELD

This document relates generally to computer-implemented credit score generation and more particularly to computer-implemented generation of variable bins for use in a credit scorecard.

BACKGROUND

Credit scoring involves assigning a risk score to a credit application or to an existing credit account based upon gathered data containing information related to a number of predictive variables. Before a predictive variable is used in a scorecard, it may be pre-processed to simplify the scorecard's predictive model using a variable transformation called "binning" (or "classing"). Binning maps the value range of a variable to a set of bins. A bin can comprise a single value, a finite set of values, a continuous range of values, or a missing value. After the scores are associated with determined bins, consumer data is applied to the developed scoring formulas for determining the creditworthiness of a particular scoring subject.

As described above, the model generation process includes a binning phase. In this phase, attributes (e.g. age, income, etc.) are segmented into grouping intervals, with the aim of aggregating a 'weight of evidence' (WOE) of a population into a small number of discrete bins. The WOE is typically the ratio of the normalized count of attribute sample members marked as good to those marked as bad. A typical credit-scoring practice is to take the logarithm of this value:

$$WeightOfEvidence_{attribute} = \log \frac{p^{good}_{attribute}}{p^{bad}_{attribute}},$$

where $$p^{good}_{attribute} = \frac{\# \, goods_{attribute}}{\# \, goods}$$

$$p^{bad}_{attribute} = \frac{\# \, bads_{attribute}}{\# \, bads}$$

An optimal set of bins offers the highest predictive power by approximating the WOE of the binned model to the true WOE. Sometimes, bins are selected such that the resulting WOE can be approximated by a simple monotonic function. However, the desired function may also be of a more arbitrary shape. This process includes the enforcement of various constraints, such as minimum/maximum number of bins, minimum/maximum bin widths, maximum number of observations per bin, etc. These requirements significantly complicate the binning process because they involve the solution of nonlinear problems, ruling out the use of fully-enumerative methodologies.

Most existing algorithms solve this problem by starting with a discretization of the attribute variable in the form of fine bins that are heuristically combined to form larger aggregate (coarse) bins. This process has been traditionally done with no acknowledgment of the global structure, and thus sometimes fails to give solutions that satisfy globally defined constraints, such as monotonicity of WOE or maximum number of points per bin, and often fails to compute an optimal solution.

SUMMARY

In accordance with the teachings provided herein, computer-implemented systems and methods are provided for generating bins for a scorecard. As an illustration, a system generates an approximate set of bins by applying an optimization model to binning data. The optimization model includes an objective function, constraints, and surrogate weight of evidence metric(s). The approximated set of bins is then used in scorecard operations.

As another illustration, a system generates an approximate set of bins by applying a mixed integer problem solver to binning data, and storing in a computer-readable storage medium or mediums the generated approximate set of bins for use in the scorecard, wherein the optimization model includes an objective function and constraints, wherein the objective function is based upon a surrogate weight of evidence metric, wherein the surrogate weight of evidence metric is an approximation of a weight of evidence metric which is indicative of levels of risk with respect to the data items contained in the first binning data.

As another illustration, a system and method may include first binning data containing data items for binning, an optimization model including an objective function and constraints, and a mixed integer problem solver configured to generate an approximate set of bins utilizing the first binning data and the optimization model, wherein the objective function is based upon a surrogate weight of evidence metric, wherein the surrogate weight of evidence metric is an approximation of a weight of evidence metric which is indicative of levels of risk with respect to the data items contained in the first binning data. Further, a computer-readable storage medium retains the generated approximate set of bins for use in the scorecard.

As yet another illustration, a system and method can be configured to start with an initial discretization. An approximate solution solves an approximate problem to handle the nonlinearity of the WOE. This approximate solution process is rigorous in that global linear constraints are implemented exactly with the use of mixed-integer programming. Furthermore, the process can be extended to a fully rigorous exact solution approach within the same mathematical programming context by the addition of exact WOE-related variables and constraints.

DETAILED DESCRIPTION

Figure 1:
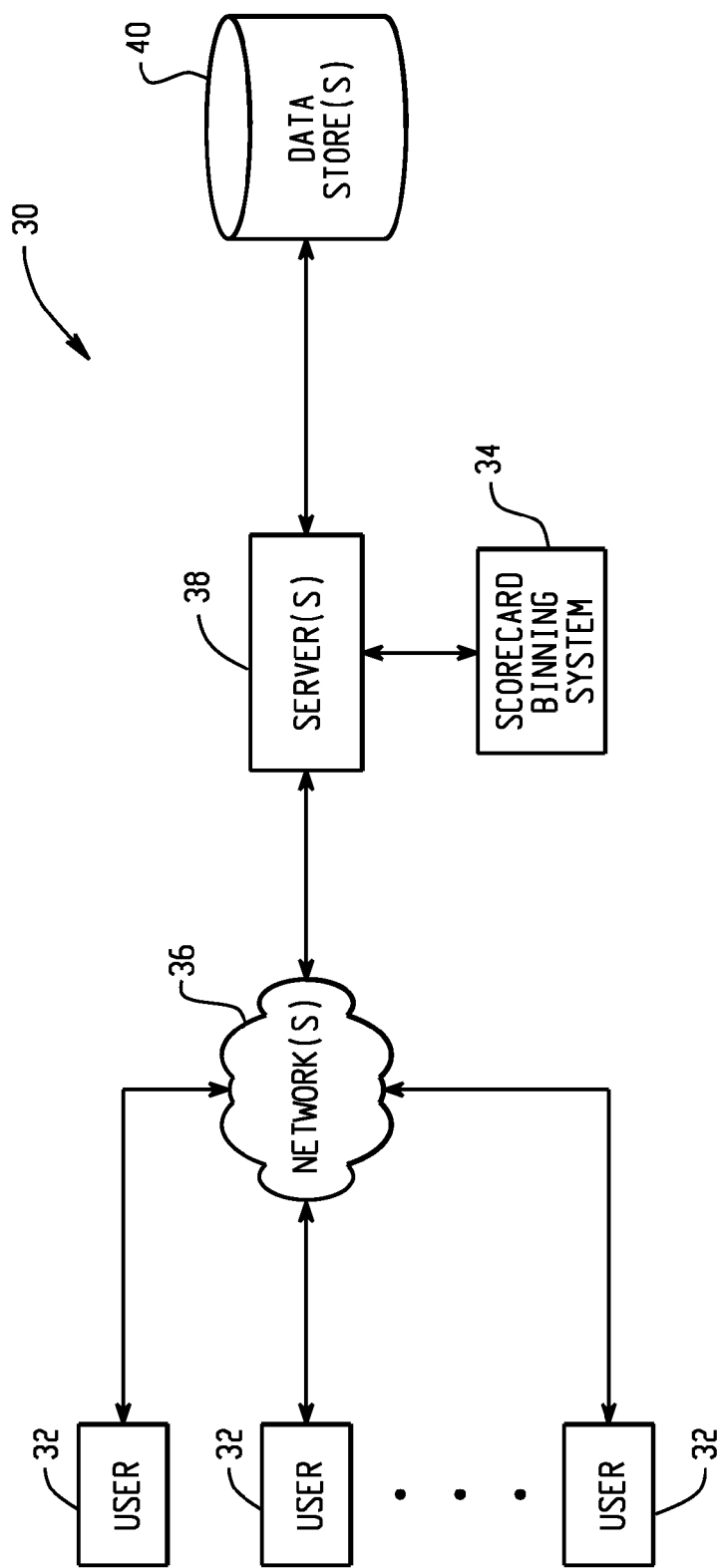
FIG. 1 is a block diagram depicting a computer-implemented environment wherein users can interact with a scorecard binning system.

FIG. 1 depicts at 30 a computer-implemented environment wherein users 32 can interact with a scorecard binning system 34 hosted on one or more servers 38 through a network 36. The system 34 contains software operations or routines for solving a constrained binning problem. The scorecard binning system 34 computes optimal binning configurations based upon consumer data and given constraints. It should be noted that while the examples described herein deal mainly with credit scorecard applications, the approaches described herein can be used in applications where predictive variables are grouped into scoring bins for modeling purposes.

The users 32 can interact with the system 34 through a number of ways, such as over one or more networks 36. One or more servers 38 accessible through the network(s) 36 can host the scorecard binning system 34. It should be understood that the scorecard binning system 34 could also be provided on a stand-alone computer for access by a user.

The scorecard binning system 34 can be an integrated web-based analysis tool that provides users flexibility and functionality for performing scorecard binning determinations and analysis or can be a wholly automated system. One or more data stores 40 can store the data to be analyzed by the system 34 as well as any intermediate or final data generated by the system 34. For example, data store(s) 40 can store the consumer data and binning constraints for use in determining the optimal predictive variable bins to be utilized based on given constraints. Examples of data store(s) 40 can include relational database management systems (RDBMS), a multi-dimensional database (MDDB), such as an Online Analytical Processing (OLAP) database, etc.

Figure 2:
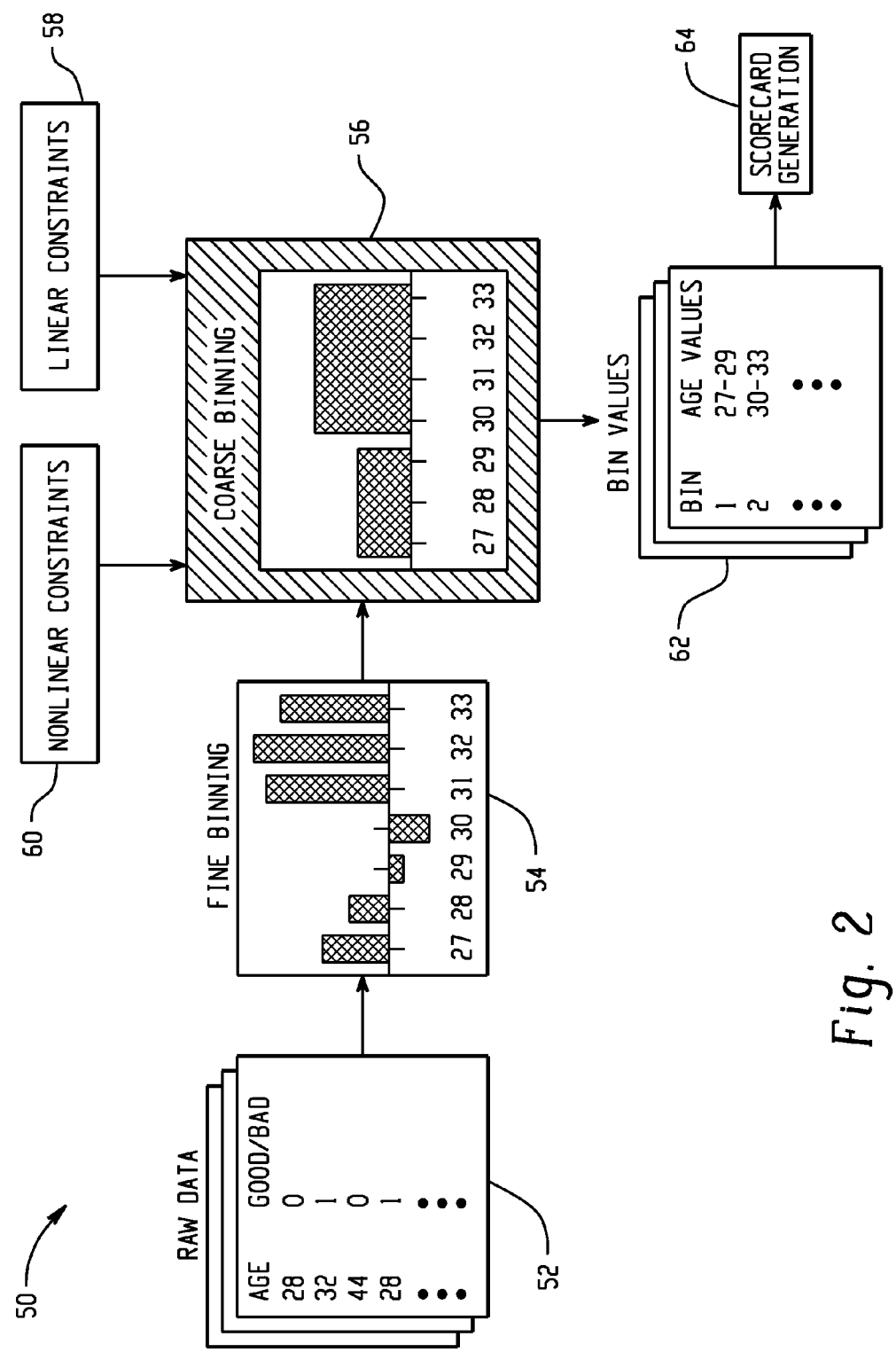
FIG. 2 depicts a flow diagram of a scorecard binning generation.

FIG. 2 depicts at 50 a flow diagram of a scorecard binning generation. The process begins when raw data 52 is received by the scorecard binning system 34. The raw data 52 may contain consumer credit data such as consumer characteristics (e.g., age, income, etc.) and a binary indicator variables that may specify, for example, that a consumer met or defaulted on a payment (good/bad).

After acquisition of raw data for a variable to be binned, a series of fine bins 54 may be determined. These fine bins 54 offer an initial discretization of the raw data. In the example of FIG. 2, the 'age' raw data is fine binned into units of a single year in length. As shown in the graph associated with the fine bins 54, a numerical value is associated with each of the discrete age values which identifies the WOE for the group. From the graphed data, it may be observed that, while each of the discrete ages has an associated historical risk of default associated with it, common characteristics may be seen throughout ranges within the scope of a variable. For example, within the fine bins 54 of FIG. 2, it may appear that younger consumers, aged 27-30, tend to have a higher default risk than elder consumers, aged 31-33, reflected by the respective WOE values.

Fine binning 54 offers a mechanism for initially discretizing a set of raw data for identifying consumer characteristics and tendencies. The system further simplifies data models by aggregating fine bins 54 into a smaller set of coarse bins 56. The use of coarse bins 56 allows for conceptual and computational simplification of data models which may be of use for models where a large number of raw data predictive variables are relied upon in computing a forecast or score. This simplification of models through coarse binning 56 is balanced by the system against losses in predictive power that are incurred based upon the simplification. For example, if all age ranges are combined into a single coarse bin, there is no differentiation based on age between the default risk of a 25 year old and that of a 45 year old consumer. Thus, the system can be configured to provide balancing between model simplicity and the retaining of predictive power of a variable.

It is noted that balance in the development of coarse bins 56 for a variable is complicated by the introduction of constraints 58, 60 into the coarse binning step 56 of the scorecard binning generation process 50. These constraints may be linear constraints 58, such as maximum/minimum number of bins, maximum/minimum size of bins, etc., or may be nonlinear constraints 60 such as requiring that the WOE associated with the coarse binning to be monotonic with respect to the attribute variable. These constraints may be introduced into the coarse binning 56 for a variety of reasons. For example, maximum/minimum number of bins and maximum/minimum size of bins requirements have an effect on the model simplicity/predictive power balance discussed above. Other constraints may be introduced for reasons other than model optimization. For example, a credit scoring law may require that a consumer not be discriminated against based on advanced age. Thus, despite the fact that the raw data might show that elderly consumers may tend to default on loans more frequently, it may be illegal for their credit score to reflect this adverse characteristic. While the raw data would show the increased credit risk for elderly consumers in this scenario, the imposition of a constraint that the scores associated with bins be monotonically increasing would result in coarse bins 56 that satisfy the legal requirement.

The coarse binning 56 results in a set of bin values 62 for each of the binned variables. As shown in the example bin values 62 of FIG. 2, the bins may be non-uniform in size such that three ages, 27-29, are encompassed by Bin #1 while four ages, 30-33, are within Bin #2. These bins values 62 are passed to the scorecard generation module 64 where scores are associated with the coarse bin values 62 via regression analysis.

Figure 3:
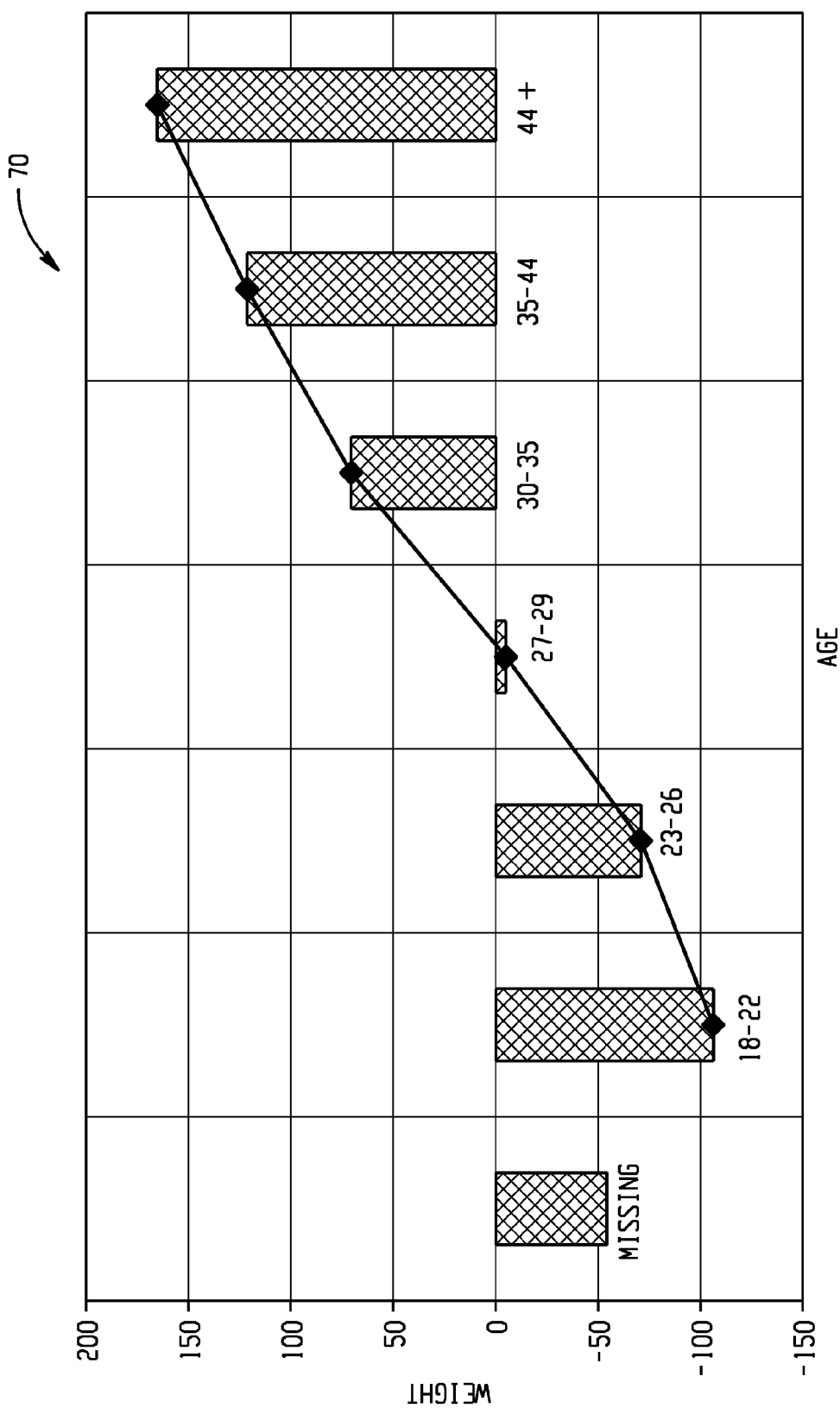
FIG. 3 depicts an example set of bins for the age variable along with the associated WOE.

FIG. 3 depicts at 70 an example set of bins 72 for the age variable (discussed in reference to FIG. 2) along with the associated WOE distribution. The set of coarse bins depicted in FIG. 3 contains six bins of varying widths (widths not reflected to scale) along with an additional bin for cases where age data is missing from a consumer record. The example of FIG. 3 illustrates a constraint of monotonically increasing WOE imposed on the aggregate (coarse) WOE relation to variable AGE: the WOE of each bin is greater than that of the preceding bin (e.g., the weight for the age 44+ bin is greater than the 35-44 bin, which is greater than the weight of the 30-35 bin, etc.). Following binning, standard statistical techniques such as regression analysis can be used to aid in generation of a final model.

Figure 4:
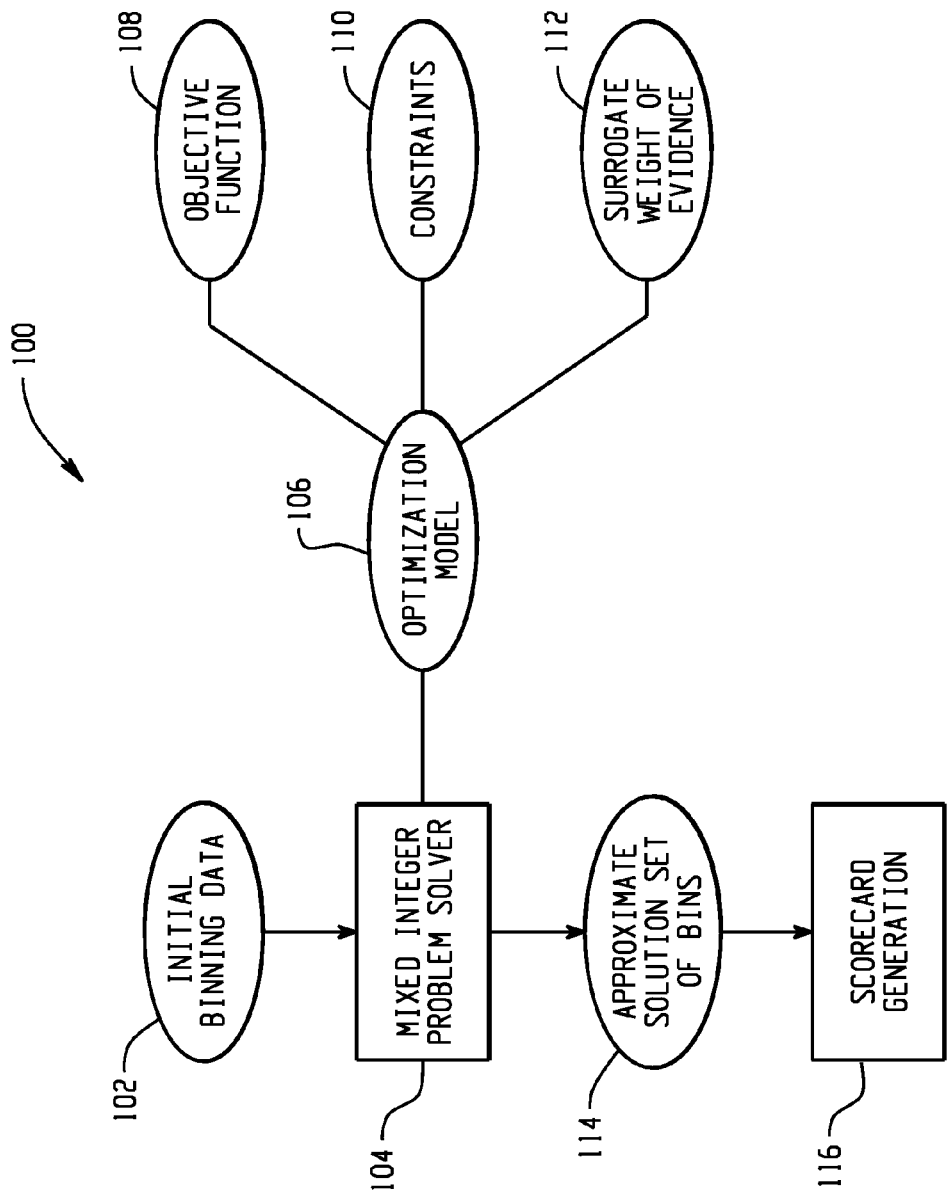
FIG. 4 depicts a flow diagram illustrating the process of determining an approximate solution set of bins.

FIG. 4 depicts at 100 a flow diagram illustrating a process for determining an approximate solution set of bins. In the approximate solution step 100, a mixed integer problem solver 104 receives initial binning data 102. This initial binning data 102 can include a fine binned representation of the predictive variables along with historical good/bad data related to the predictive variables. The mixed integer problem solver 104 uses an optimization model 106 which includes an objective function 108, a set of binning constraints 110, and surrogate weight of evidence variable(s) 112. The objective function 108 seeks to minimize the deviation between the surrogate weight of evidence variable 112 related to the binned model and the standard weight of evidence variable related to the actual weight of evidence without binning.

The constraints 110 introduce additional requirements into the mixed integer problem solver 104 through the optimization model 106. Upon receipt of the initial binning data 102 and optimization model 106, the mixed integer problem solver 104 computes an approximate solution set of bins 114 for use in scorecard generation 116. The generated approximate solution set of bins 114 may be used immediately in scorecard generation 116, or the approximate set of bins 114 may be saved in a data store (not shown) for later use in scorecard generation.

Figure 5:
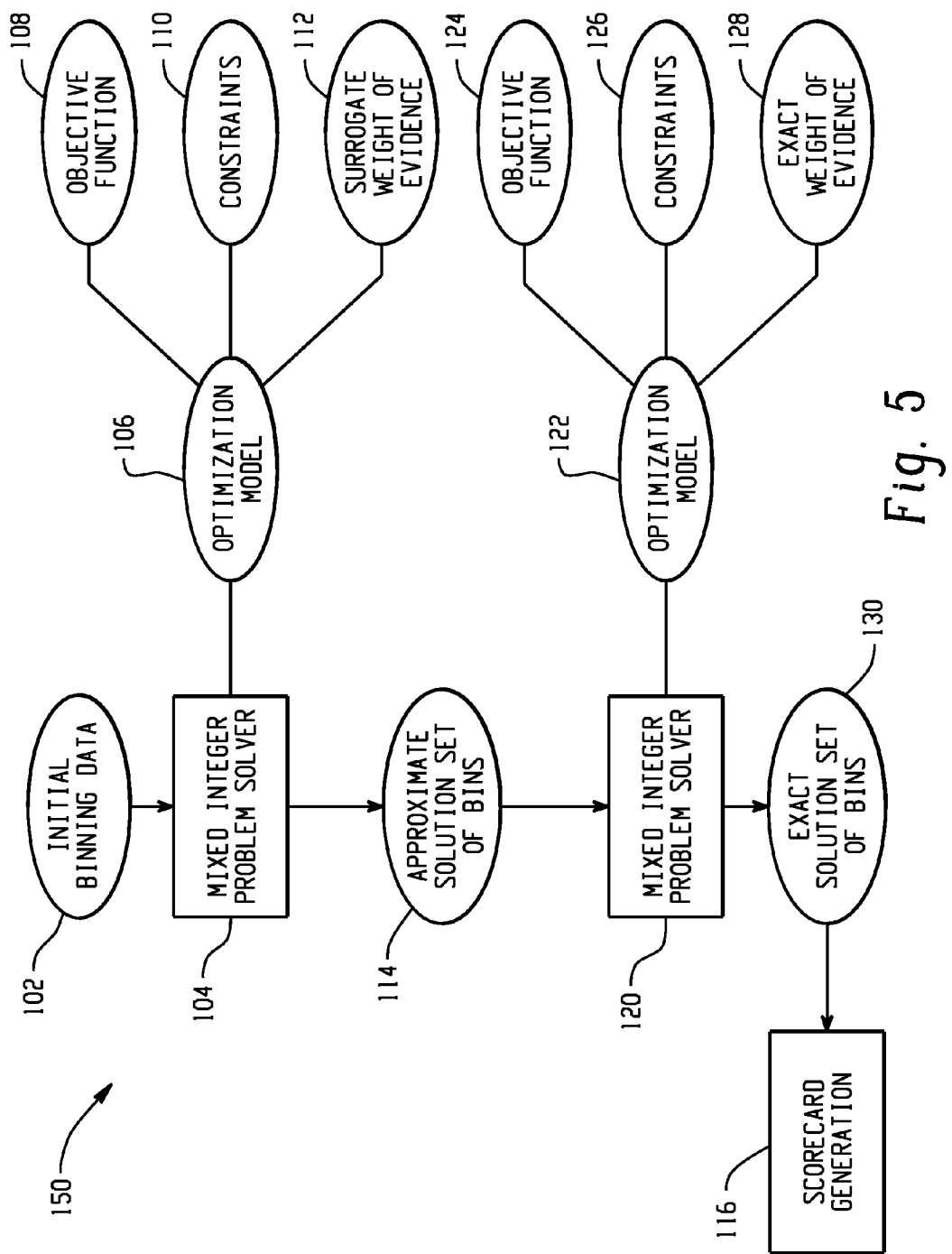
FIG. 5 depicts a flow diagram illustrating the process of determining an exact solution set of bins.

FIG. 5 depicts at 150 a flow diagram illustrating a process for determining an exact solution set of bins. Initial binning data 102 and an optimization model 106 that includes an objective function 108, binning constraints 110, and a surrogate weight of evidence variable 112 are used by a first mixed integer problem solver 104. The first mixed integer problem solver 104 determines an approximate solution set of bins 114. The approximate solution set of bins 114 is then further provided to warm-start a second mixed integer problem solver 120. The second mixed integer problem solver 120 further receives a second optimization model 122 which may include a second objective function 124, constraints 126 and an exact weight of evidence variable 128. The second objective function 124 and constraints 126 may be based on the first objective function 108 and constraints 110 that were included in the first optimization model 106. The second mixed integer problem solver 120 determines an exact solution set of bins 130 based upon the received approximate solution set of bins 114 and the second optimization model 122. This determined exact solution set of bins 130 may then be saved in a data store (not shown) or can be used immediately in a scorecard generation 116.

Figure 6:
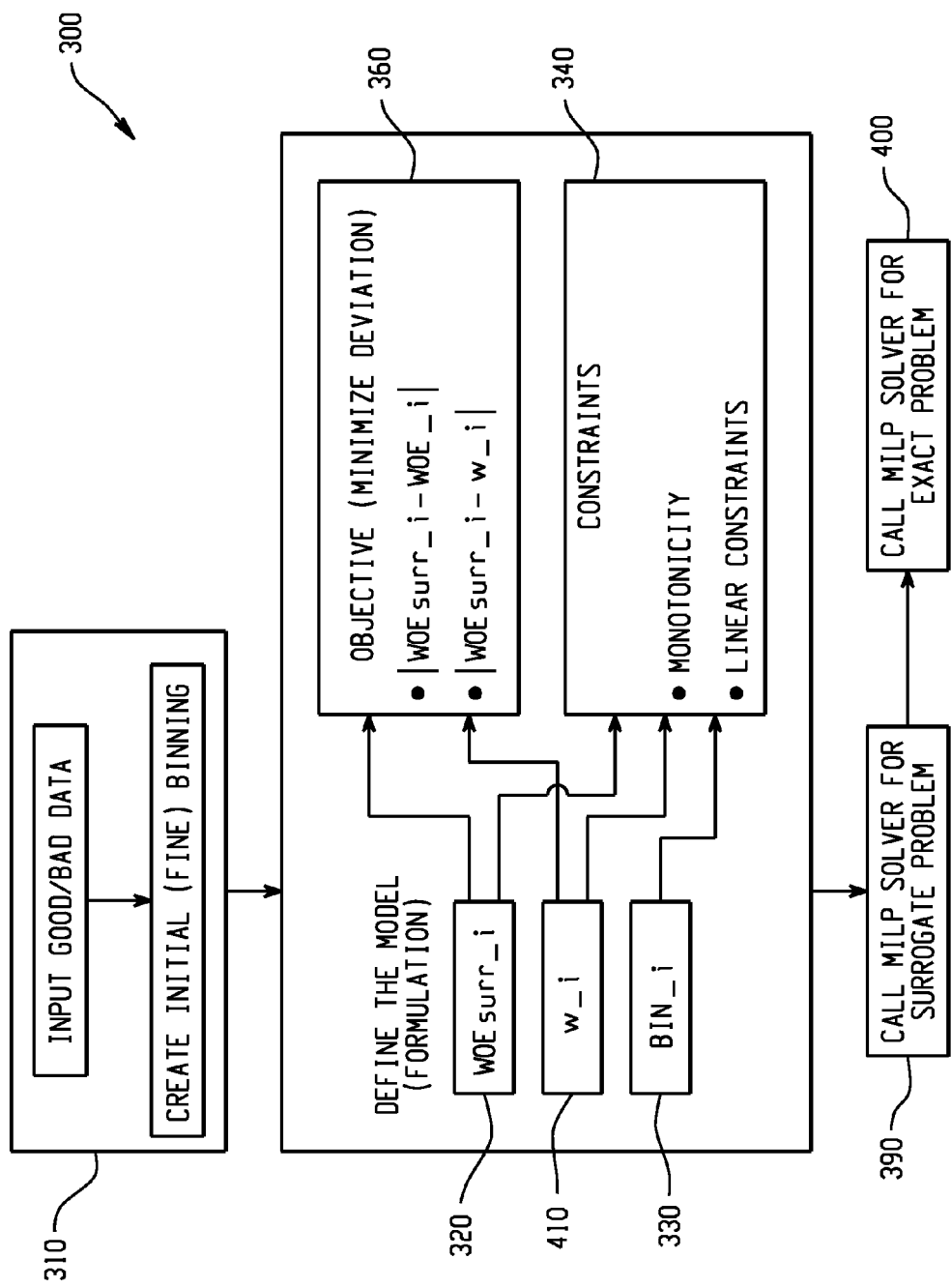
FIG. 6 depicts a flow diagram further depicting the process of determining an exact solution set of bins.

FIG. 6 depicts at 300 an example for determining an exact solution set of bins. At 310, a set of good/bad attribute data is imported. From this data, the WOE_i over the sample's fine bin grid for grid points i=1, . . . , N is calculated. At 320, a continuous variable 'WOEsurr_i' is defined which serves as a surrogate to the WOE_i function. In this example, the objective is to minimize a measure of the difference between WOE_i and WOEsurr_i, thereby avoiding any use of WOE as an explicit nonlinear function in the problem formation. This eliminates nonlinearity from the problem, which facilitates the use of mixed-integer programming in the processing flow.

At 330, a binary clustering variable, BIN_i for i=0, . . . , N is defined. The action of this binary clustering variable is to codify a possible solution as follows: If BIN_i=0, then fine bins i and i−1 belong to the same coarse bin. This may occur many times for i+1, . . . , i+K, which would mean that K+1 such fine bins are grouped into the same coarse bin. If BIN_i=1, then fine bins i and i−1 are to be considered parts of separate bins. This can also be stated as follows: if BIN_i=1, then fine bin i initiates a coarse bin, otherwise (i.e., if BIN_i=0) fine bin i belongs to the same coarse bin as fine bin i−1.

Figure 7:
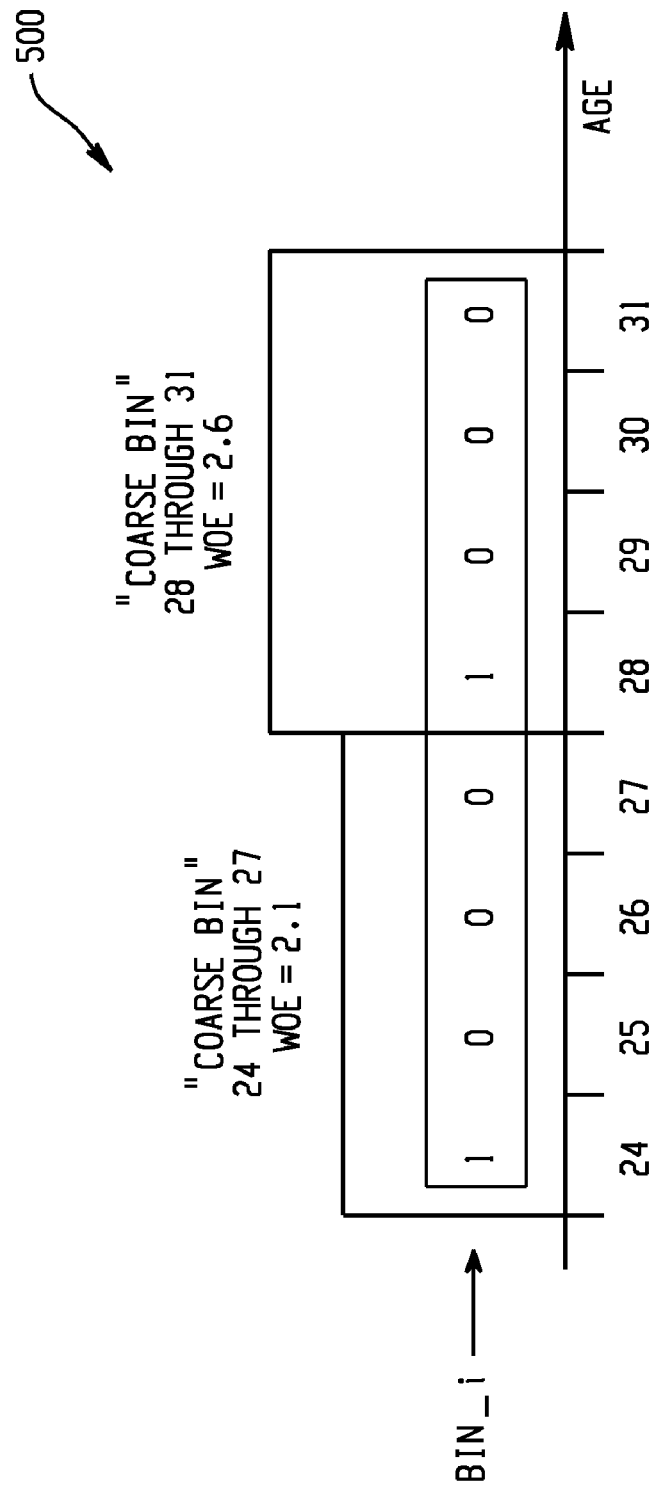
FIG. 7 depicts an example representation of BIN_i and its relationship to a set of determined bins.

FIG. 7 depicts at 500 an example representation of BIN_i and its relationship to a set of determined bins. Notice that values of '1' are present at the array elements associated with ages 24 and 28. These indicators represent the start of a new bin at age 24 and the start of a second new bin at age 28 as described previously. It should be noted that the procedures for the BIN_i array may be reversed such that a '0' represents the beginning of a new bin and a '1' corresponds with a continuation of the current bin.

With reference back to FIG. 6, for each fine bin i, the scorecard binning system 34 precomputes at 340 the right-most (or left-most) fine bin that is allowed to be a part of the same coarse bin if such a coarse bin were to start at i. All linear constraints (e.g., minimum/maximum number of total bins, minimum/maximum bin width, maximum number of fine bins per coarse bin, minimum/maximum number of good/bad points in each bin, minimum/maximum of total points in each bin, minimum difference in WOE between two consecutive bins, etc.) will be based on such precomputed values as discussed below. For example, given a maximum allowed observations per coarse bin (MxPerBin) and the number of observations in any fine bin k (varS[k]), the right-most allowed fine bin (MxRighBinI) to be used in any bin clustering that starts at bin i (as its left-most bin) can be computed as:

$$MxRighBinI_i = \max_{p \in \{i, \ldots, cardN\}:\ \sum_{k=i}^{P} S_k \leq MxPerBin} p$$

This mathematical expression can be expressed, for example, by the following software code:
    num MxRighBinI{i in N}=max{p in i . . . cardN:
      (sum{k in i . . . p}varS[k])<=MxPerBin}p;
where N is the set of fine bins, and cardN is the number of fine bins in the entire set. The full set of limits for right and left coarse bins are listed below:

$$MxRighBinI_i = \min\left(cardN, \max_{\{p \in \{i, \ldots, cardN\}:\ \sum_{k=i}^{P} S_k \leq MxPerBin, high_p - low_p \leq MxBinWidth\}} p\right), \forall i \in N,$$

$$MnRighBinI_i = \min\left(cardN, \min_{\substack{\{p \in \{i, \ldots, cardN\}:\ \sum_{k=i}^{P} G_k \geq MnPerBinG, \sum_{k=i}^{P} B_k \geq MnPerBinB, \\ \sum_{k=i}^{P} S_k \geq MnPerBinT, high_p - low_p \geq MnBinWidth\}}} p\right), \forall i \in N,$$

$$MxLeftBinI_i = \max\left(1, \min_{\{p \in \{1, \ldots, i\}:\ \sum_{k=p}^{i} S_k \leq MxPerBin, high - low_p \leq MxBinWidth\}} p\right), \forall i \in N,$$

$$MnLeftBinI_i = \max\left(1, \max_{\substack{\{p \in \{1, \ldots, i\}:\ \sum_{k=p}^{i} G_k \geq MnPerBinG, \sum_{k=p}^{i} B_k \geq MnPerBinB, \\ \sum_{k=p}^{i} S_k \geq MnPerBinT, high_i - low_p \geq MnBinWidth\}}} p\right), \forall i \in N.$$

These limits can be expressed, for example, by the following software code:
    num MxRighBinI{i in N}=min(cardN,max{p in i . . . cardN:
      (sum{k in i . . . p}varS[k])<=MxPerBin and (high[p]−low[i])<=MxBinWidth}p);
num MnRighBinI{i in N}=min(cardN,min{p in i . . .
  cardN:
  (sum{k in i . . . p}varG[k])>=MnPerBinG
  and (sum{k in i . . . p}varB[k])>=MnPerBinB
  and (sum{k in i . . . p}varS[k])>=MnPerBinT
  and (high[p]−low[i])>=MnBinWidth}p);
num MxLeftBinI{i in N}=max(1,min{p in 1 . . . i:
  (sum{k in p . . . i}varS[k])<=MxPerBin
  and (high[i]−low[p])<=MxBinWidth}p);
num MnLeftBinI{i in N}=max(1,max{p in 1 . . . i:
  (sum{k in p . . . i}varG[k])>=MnPerBinG
  and (sum{k in p . . . i}varB[k])>=MnPerBinB
  and (sum{k in p . . . i}varS[k])>=MnPerBinT
  and (high[i]−low[p])>=MnBinWidth}p);
where MxRighBinI[i] is the right-most fine bin that is allowed to be in the same coarse bin as i if a bin starts at i; MnRighBinI[i] is the first fine bin that is part of the same coarse bin if a bin starts at i; MxPerBin is the maximum number of observations per bin, MxBinWidth is the maximum bid width, MnPerBinG is the minimum number of good observations per bin, MnPerBinB is the minimum number of bad observations per bin, MnPerBinT is the minimum number of total observations per bin, MnBinWidth is the minimum bin width.

All linear constraints can then be economically defined based on these precomputed values. For example, maximum size per clustering is imposed as:

$$\sum_{p=MnRighBinI_j+1}^{MxRighBinI_j+1} BINi_p \geq BINi_j,$$

$$\forall j = 1, \ldots, (cardN - 1): MnRighBinI_j < cardN$$

This constraint can be expressed, for example, by the following software code:
  con mxBinSizeR{j in 1 . . . cardN−1: MnRighBinI[j]
    <cardN}:
    sum{p in (MnRighBinI[j]+1) . . . (MxRighBinI[j]+1)}
    BIN_i[p]>=BIN_i[j];

This constraint set is reduced from a more generic set on all possible combinations, yet is just as complete. The formulation traverses constraints forward (i.e., from i=1 through i=cardN−1). Traversing backward is not necessary in this particular case because of its symmetric structure. However, backward traversal may be used for other types of constraints such as the minimum bin size constraint.

At 360, the objective of the first phase concerning generation of an approximate solution set of bins in the surrogate problem is to minimize the L1 norm of the deviation between the WOE surrogate (woe_surr[i]) and the true WOE (woe[i]) for all bins. This objective can be weighted by the number of observations in fine bins (varS[i]) as follows:

$$\min \sum_{i \in N} S_i |woe_i - woe\_surr_i|$$

This objective can be expressed, for example, by the following software code:
  min obj=sum{i in N} (vars[i]*L1[i]);
  con L1nrm1{i in N}: L1[i]>=(woe[i]−woe_surr[i]);
  con L1nrm2{i in N}: L1[i]>=(woe_surr[i]−woe[i]);
The following constraints may be imposed to force equal values of WOE for each coarse bin element:

/* impose WOE equality inside coarse bins */
con WOEcoarse1{j in 2 . . . and N}:
  woe_surr[j]>=woe_surr[j−1]−M*Bin_i[j];
con WOEcoarse2{j in 2 . . . and N}:
  woe_surr[j]<=woe_surr[j−1]+M*Bin_i[j];
where M is a maximum upper bound on the possible difference in values of WOE for all i:

$$M = [\max\{I \text{ in } 1 \ldots \text{ and } N\} \text{ WOE}[i] + \text{MinDiff}*(\text{Mx-NumBin}-1)] - [\min\{I \text{ in } 1 \ldots \text{ and } N\} \text{ WOE}[i] - \text{MinDiff}*(\text{MxNumBin}-1)]$$

Monotonicity appears in the first phase generation of an approximate solution in a linear form because the monotonicity is based on the approximate value woe_surr, as opposed to the actual WOE value of each coarse bin. This may be represented as follows where MinDiff is the minimum WOE difference required between coarse bins provided by the user:

/* monotonicity */

$$woe\_surr_j \geq woe\_surr_{j-1} + MinDiff * BINi_j, \forall j = 2, \ldots, cardN$$

This mathematical expression can be expressed, for example, by the following software code:
  con monotup{j in 2 . . . cardN}: woe_surr[j]>=woe_surr
    [j−1]+MinDiff*BIN_i[j];

Thus, constraints have been developed for the requirements, such as: minimum/maximum bin size, minimum/maximum bin width, maximum number of fine bins per coarse bin, minimum/maximum number of good/bad points in each bin, minimum/maximum number of total points in each bin, and minimum difference in WOE between two consecutive bins. These six constraints are captured by MnRighBinI, MxRighBinI, MxLeftBinI, MnLeftBinI, as defined at 340, and by the following constraints:

/* minimum bin size */

$$BINi_j + BINi_p \leq 1, \forall j = MnRighBinI_1, \ldots, MnLeftBinI_{cardN},$$

$$p = (j+1), \ldots, MnRightBinI_j$$

This constraint can be expressed, for example, by the following software code:
  con mnBinSizeR{j in (MnRighBinI[1]+1) . . . MnLeftBinI
    [cardN], p in
  (+1) . . . MnRighBinI[j]: p<=MnLeftBinI[cardN]}:
    BIN_i[j]+BIN_i[p]<=1;
/* maximum bin size */

$$\sum_{p=MnRighBinI_j+1}^{MxRighBinI_j+1} BINi_p \geq BINi_j, \forall j = 1, \ldots, (cardN - 1)$$

This constraint can be expressed, for example, by the following software code:
  con mxBinSizeR{j in 1 . . . cardN−1: MnRighBinI[j]
    <cardN}:
    sum{p in (MnRighBinI[j]+1) . . . (MxRighBinI[j]+1)}
    BIN_i[p]>=BIN_i[j];
A seventh constraint, minimum/maximum number of total bins, can be represented as:
/* min/max number of bins */

$$MnNumBin \le \sum_{j=1}^{cardN} BINi_j \le MxNumBin_j$$

This constraint can be expressed, for example, by the following software code:
    con rangeofbin: MnNumBin<=sum{j in 1 . . . cardN} BIN_i[j]<=MxNumBin;

At 390, the values of BIN_i are unknown variables that are solved for via a Mixed Integer Linear Programming (MILP) solver. This may be done by coding the problem, as stated above or equivalently, and solving the problem using a MILP solver. The construction of constraints in the above economical form allows the problem to be solved efficiently and effectively. For example, a high optimality gap (~20%) may be set on a first pass producing a feasible result that satisfies all constraints and that is relatively close to optimal. The woe[i] are then set to their new cluster values defined as the WOE of the entire cluster indicated by the merge variable BIN_i[i] for all fine bins i. The MILP solver is then re-run to localize an optimum solution.

If there is a need for an exact solution (where woe[i]=woe_surr[i]), the second phase of the algorithm may be employed as depicted at 400. In an exact solution case, a surrogate function is not satisfactory and the computed binning WOE's reflects the predicted WOE's with the exception of limitations imposed such as via the monotonicity constraint. The mixed-integer linear programming model can be extended to incorporate this requirement at the expense of solving a more computationally expensive problem. Using the solution to the surrogate problem found at 390 as an initial point for the algorithm (which speeds processing of the solution), a new variable is introduced which will later replicate the actual WOE of the binned data:
    /* woe variable */
    num woenew{N};
In the constraint set, the variable is forced to replicate the WOE's values as follows where w[j].lb and w[j].ub are pre-computed lower and upper bounds, respectively, for the w variable based on the known values of WOE:
    /* new woe variable */
    var w{i in N};
    /* tuple set used to define allowable (begin,end) of coarse bins */

$$Di = \{(i, p): i = 1, \ldots, MnLeftBin, p = MnRightBinI_i, \ldots, MxRighBinI_i\}$$

This set can be expressed, for example, as follows:
    set Di init {i in 1 . . . MnLeftBinI[cardN], p in MnRighBinI[i]
    . . . (MxRighBinI[i])};

/* computable values of woe if a coarse bin begins/ends at <i,j> in Di */
/* varGt[k]=varG[k]/varS[k], varBt[k]=varB[k]/varS[k]*/

$$woeip_{i,p} = \log \frac{\sum_{k=i}^{p} Gt_k}{\sum_{k=i}^{p} Bt_k}, \forall (i, p) \in Di$$

This expression can be expressed, for example, by the following software code:

$$num\ woeip\{<i, p> \text{ in } Di\} = \log\left(\frac{(sum\{k \text{ in } i \ldots p\}varGt[k])}{(sum\{k \text{ in } i \ldots p\}varBt[k])}\right);$$

/* helper variable used in the constraints below*/

$$x_{i,p} = -\sum_{k=MnRighBinI_i+1}^{p} BINi_k + BINi_i + BINi_{p+1} - 1,$$

$$\forall (i, p) \in Di$$

This expression can be expressed, for example, by the following software code:

$$def varx\{<i, p> \text{ in } Di\} =$$
$$-(sum\{k \text{ in } MnRighBinI[i] + 1 \ldots p\}BIN\_i[k]) + BIN\_i[i] + BIN\_i[p + 1] - 1;$$

/* constraints that force w = woe of corresponding final bin*/

$$w_{j-1} + (w_j \cdot lb - w_{j-1} \cdot ub) * BINi_j \le w_j \le w_{j-1} + (w_j \cdot ub - w_{j-1} \cdot lb) * BINi_j,$$

$$\forall j \in 2, \ldots, cardN$$

This mathematical expression can be expressed, for example, by the following software code:
    con wEquaL{j in 2 . . . cardN}:
        w[j]>=w[j−1]+(w[j].lb−w[j−1].ub)*BIN_i[j];
    con wEquaU{j in 2 . . . cardN}:
        w[j]<=w[j−1]+(w[j].ub−w[j−1].lb)*BIN_[j];

$$woeip_{i,p} + (w_i \cdot lb - woeip_{i,p}) * (1 - x_{i,p}) \le$$
$$w_i \le woeip_{i,p} + (w_i \cdot ub - woeip_{i,p}) * (1 - x_{i,p}),$$
$$\forall (i, p) \in Di$$

This constraint can be expressed, for example, by the following software code:
    con wConsLr{<i,p> in Di}:
        w[i]>=woeip[i,p]+(w[i].lb−woeip[i,p])*(1−x[i,p]);
    con wConsUr{<i,p> in Di}:
        w[i]<=woeip[i,p]+(w[i].ub−woeip[i,p])*(1−x[i,p]);
In the objective function, the w variable plays the role of forcing the surrogate to the WOE:

$$\min \sum_{i \in N} S_i(|woe_i - woe\_surr_i| + |w_i - woe\_surr_i|)$$

This may be expressed, for example, by the following software code:

min obj=sum{i in N} (varS[i]*L1[i])+sum{i in N} (varS[i]*L1w[i]);
con L1nrm1w{i in N}: L1w[i]>=(w[i]−woe_surr[i]);
con L1nrm2w{i in N}: L1w[i]>=(woe_surr[i]−w[i]);

The approximate solution set of bins calculated at 390 is used as a feasible initial point in the above model to provide a warm-start solution to the calculation of the exact problem solving at 400 which improves computational efficiency.

It should be noted that many of the steps discussed in relation to this processing flow (and other flows discussed herein) may be performed in a different order while still determining proper results. Therefore, the reference numbering and order of discussion of these steps should not be deemed limiting.

Figure 8:
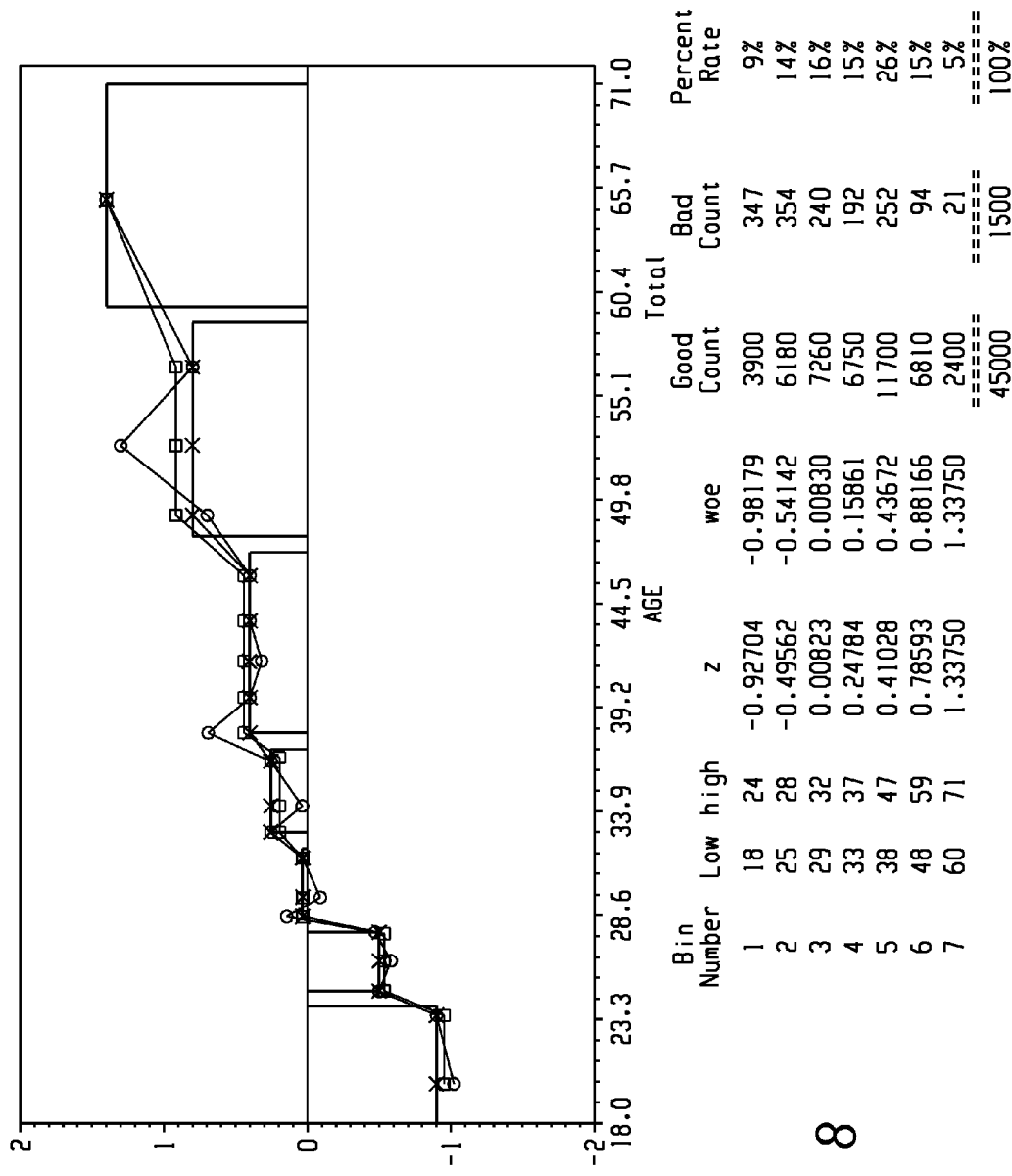
FIG. 8 depicts an example set of determined approximate bins along with a table regarding the definition of the bins.
Figure 9:
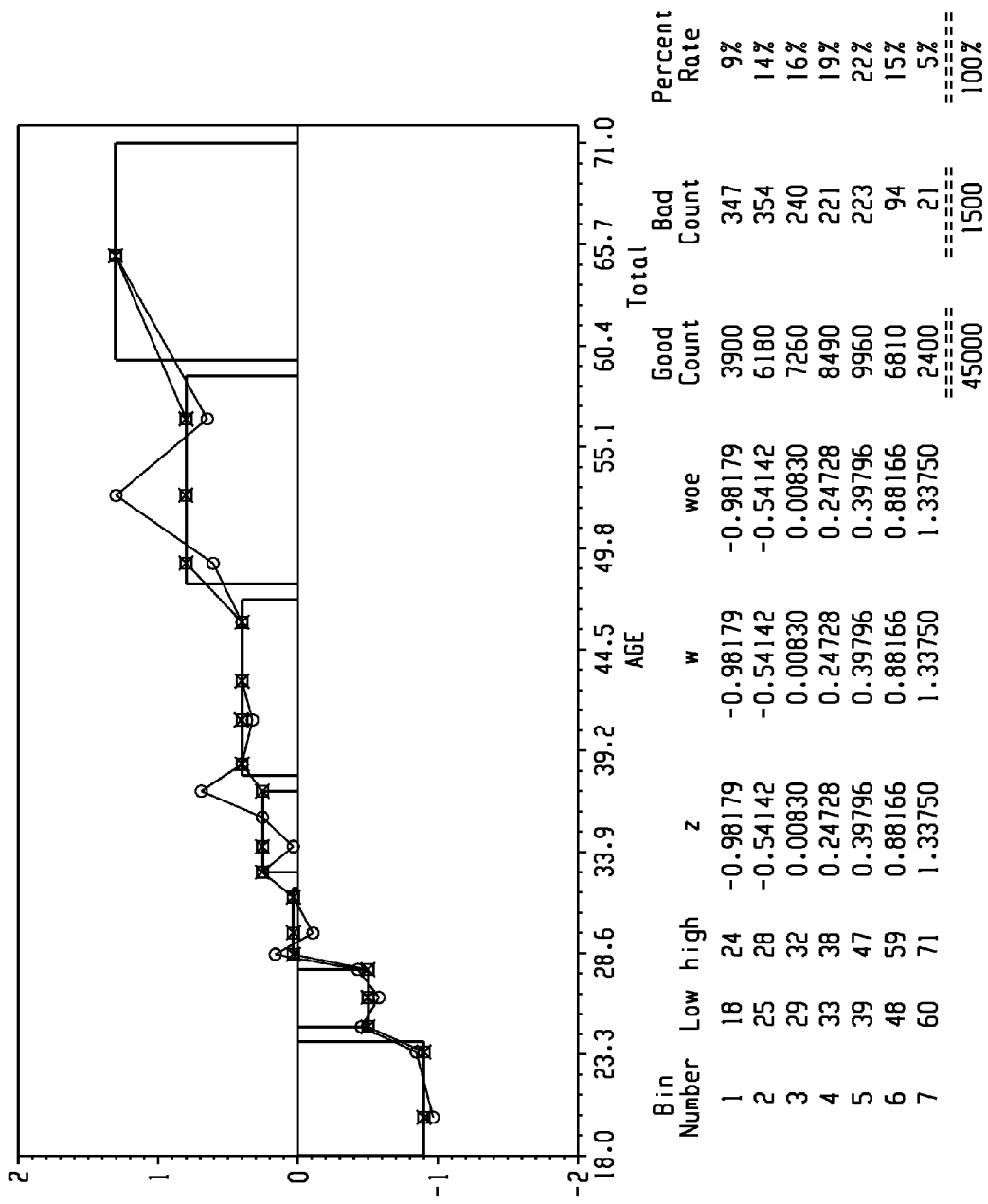
FIG. 9 depicts an example set of determined exact bins along with underlying data regarding the definition of the bins.

FIGS. 8 and 9 depict example applications of the determination of an approximate solution and an exact solution to a given binning problem, respectively. The following parameters are used in the example:
%let MinBinDiff=0.01;
/* 0 to disable any of the below */
%let MinNumBins=5;
%let MaxNumBins=15;
%let MinBinWidth=3;
%let MaxBinWidth=18;
/* percentages of total num points, i.e. 10=10% */
%let MinNumGoodPoints=0;
%let MinNumBadPoints=0;
%let MinNumTotalPoints=5;
%let MaxNumPoints=50;
/* 0: anything goes
   1: impose monotonicity,
   2: at most one extremum,
   3: at most two extrema */
%let Monotonicity=1;

In these examples, binning results are shown for the 'age' predictive variable. The x-axis represents the attribute values. Points denoted by a circle indicator 610 show the individual WOE values for each fine bin. The data represented by the darker horizontal rows of cross indicators 630 shows the solution WOE_surr which suggests the binning clustering in the solution. The table shows the binning clusters explicitly with bounding (low/high) attribute values for each bin. FIG. 8 depicts the approximate solution for the 'age' predictive variable. FIG. 9 depicts the exact solution for the 'age' predictive variable. Note that in the table corresponding to the exact solution in FIG. 9, the values of z and woe match exactly because a feasible monotonic curve exists within the given constraints and was found by the exact solution set process.

Figure 10:
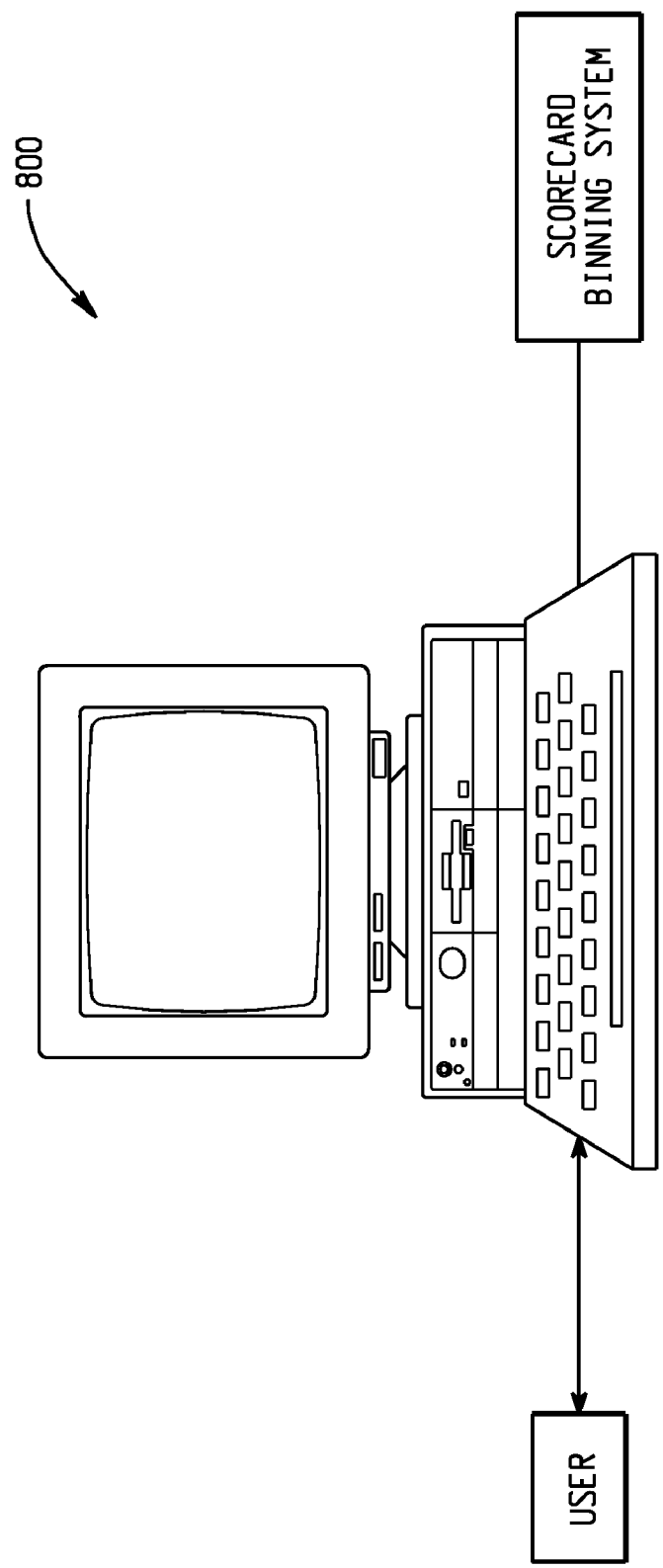
FIG. 10 is a block diagram depicting an environment wherein a user can interact with a scorecard binning system.

While examples have been used to disclose the invention, including the best mode, and also to enable any person skilled in the art to make and use the invention, the patentable scope of the invention is defined by claims, and may include other examples that occur to those skilled in the art. Accordingly, the examples disclosed herein are to be considered non-limiting. As an illustration, the systems and methods may be implemented on various types of computer architectures, such as for example on a single general purpose computer or workstation (as shown at 800 on FIG. 10), or on a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer implemented method of generating a scoring model, comprising:
   accessing, using one or more data processors, a plurality of transactional data records organized into a plurality of fine bins, wherein the data records include an attribute and an indicator variable, and wherein the data records are organized into the plurality of fine bins according to the attribute,
   associating, using the one or more data processors, a weight of evidence with the plurality of fine bins, wherein the weight of evidence is based upon the indicator variable of the data records, and wherein the weight of evidence indicates a level of risk corresponding to the data records;

minimizing, using an objective function and the one or more data processors, a difference between the weight of evidence associated with the plurality of fine bins and a surrogate weight of evidence associated with a plurality of coarse bins;

generating, using the one or more data processors, an optimization model using the objective function, one or more constraints, and a surrogate weight of evidence, wherein the one or more constraints include linear constraints derived from business requirements, and wherein the one or more constraints include one or more of a minimum or maximum number of total bins, minimum or maximum bin widths, a maximum number of fine bins per coarse bin, a minimum or maximum number of good or bad points in each bin, a minimum or maximum number of total points in each bin, and a minimum difference in weight of evidence between two consecutive bins;

generating, using the one or more data processors, a plurality of coarse bins by applying a mixed integer problem solver to the optimization model;

associating, using the one or more data processors, the surrogate weight of evidence with the plurality of coarse bins, wherein the surrogate weight of evidence is based upon the indicator variable of the data records, and wherein the surrogate weight of evidence indicates a level of risk corresponding to the data records; and generating, using the one or more data processors, a scoring model using the coarse set of bins, wherein the scoring model predicts a level of financial risk for a financial transaction.

2. The method of claim 1, wherein the scoring model is configured to assign a risk score to a credit application or to an existing credit account.

3. The method of claim 1, wherein the attribute is an age attribute or an income attribute.

4. The method of claim 1, wherein the one or more constraints include a non-linear constraint.

5. The method of claim 4, wherein the non-linear constraint is associated with the weight of evidence metric.

6. The method of claim 1, wherein the plurality of coarse bins are generated using a bin data structure that includes binary variables that denote beginnings or ends of coarse bins.

7. The method of claim 1, wherein a coarse bin spans a plurality of fine bins.

8. A system for generating a scoring model, comprising:
one or more processors;
one or more computer-readable storage mediums containing instructions configured to cause the one or more processors to perform operations including:
accessing a plurality of transactional data records organized into a plurality of fine bins, wherein the data records include an attribute and an indicator variable, and wherein the data records are organized into the plurality of fine bins according to the attribute,
associating a weight of evidence with the plurality of fine bins, wherein the weight of evidence is based upon the indicator variable of the data records, and wherein the weight of evidence indicates a level of risk corresponding to the data records;
minimizing, using an objective function, a difference between the weight of evidence associated with the plurality of fine bins and a surrogate weight of evidence associated with a plurality of coarse bins;
generating an optimization model using the objective function, one or more constraints, and a surrogate weight of evidence, wherein the one or more constraints include linear constraints derived from business requirements, and wherein the one or more constraints include one or more of a minimum or maximum number of total bins, minimum or maximum bin widths, a maximum number of fine bins per coarse bin, a minimum or maximum number of good or bad points in each bin, a minimum or maximum number of total points in each bin, and a minimum difference in weight of evidence between two consecutive bins;
generating a plurality of coarse bins by applying a mixed integer problem solver to the optimization model;
associating the surrogate weight of evidence with the plurality of coarse bins, wherein the surrogate weight of evidence is based upon the indicator variable of the data records, and wherein the surrogate weight of evidence indicates a level of risk corresponding to the data records; and
generating a scoring model using the coarse set of bins, wherein the scoring model predicts a level of financial risk for a financial transaction.

9. The system of claim 8, wherein the scoring model is configured to assign a risk score to a credit application or to an existing credit account.

10. The system of claim 8, wherein the attribute is an age attribute or an income attribute.

11. The system of claim 8, wherein the one or more constraints include a non-linear constraint.

12. The system of claim 11, wherein the non-linear constraint is associated with the weight of evidence metric.

13. The system of claim 8, wherein a bin data structure uses binary variables to denote beginnings or ends of coarse bins.

14. The system of claim 8, wherein a coarse bin spans a plurality of fine bins.

15. A computer program product for generating a scoring model, tangibly embodied in a machine-readable non-transitory storage medium, including instructions configured to cause a data processing system to:
access a plurality of transactional data records organized into a plurality of fine bins, wherein the data records include an attribute and an indicator variable, and wherein the data records are organized into the plurality of fine bins according to the attribute,
associate a weight of evidence with the plurality of fine bins, wherein the weight of evidence is based upon the indicator variable of the data records, and wherein the weight of evidence indicates a level of risk corresponding to the data records;
minimize, using an objective function, a difference between the weight of evidence associated with the plurality of fine bins and a surrogate weight of evidence associated with a plurality of coarse bins;
generate an optimization model using the objective function, one or more constraints, and a surrogate weight of evidence, wherein the one or more constraints include linear constraints derived from business requirements, and wherein the one or more constraints include one or more of a minimum or maximum number of total bins, minimum or maximum bin widths, a maximum number of fine bins per coarse bin, a minimum or maximum number of good or bad points in each bin, a minimum or maximum number of total points in each bin, and a minimum difference in weight of evidence between two consecutive bins;

generate a plurality of coarse bins by applying a mixed integer problem solver to the optimization model;

associate the surrogate weight of evidence with the plurality of coarse bins, wherein the surrogate weight of evidence is based upon the indicator variable of the data records, and wherein the surrogate weight of evidence indicates a level of risk corresponding to the data records; and generate a scoring model using the coarse set of bins, wherein the scoring model predicts a level of financial risk for a financial transaction.

* * * * *